United States Patent [19]

Park

[11] Patent Number: 4,481,058
[45] Date of Patent: Nov. 6, 1984

[54] HEAT-SEALABLE LAMINAR THERMOPLASTIC FILMS

[75] Inventor: Hee C. Park, Fairport, N.Y.

[73] Assignee: Mobil Oil Corporation, New York, N.Y.

[21] Appl. No.: 413,186

[22] Filed: Aug. 30, 1982

Related U.S. Application Data

[60] Division of Ser. No. 248,937, Mar. 30, 1981, Pat. No. 4,367,112, which is a continuation-in-part of Ser. No. 99,171, Nov. 30, 1979, abandoned.

[51] Int. Cl.$^3$ .............................................. B29G 19/00
[52] U.S. Cl. ............................. 156/244.24; 428/349; 428/516; 428/520; 427/407.1; 156/244.14; 156/244.23
[58] Field of Search ...................... 428/520, 516, 349; 156/244.23, 244.14, 244.24; 427/407.1

[56] References Cited

U.S. PATENT DOCUMENTS

| | | | |
|---|---|---|---|
| 4,147,827 | 4/1979 | Breidt et al. | 428/517 |
| 4,198,256 | 4/1980 | Andrews et al. | 428/520 |
| 4,364,989 | 12/1982 | Moyle | 428/520 |
| 4,367,112 | 1/1983 | Park | 156/244.23 |

Primary Examiner—George F. Lesmes
Assistant Examiner—E. Rollins Buffalow
Attorney, Agent, or Firm—Alexander J. McKillop; Michael G. Gilman; Charles J. Speciale

[57] ABSTRACT

A biaxially oriented polypropylene film is provided which exhibits improved heat-seal strength and good optical clarity. The polypropylene film is characterized by having on at least one surface thereof a continuous coating of a heat-sealable film layer comprising a copolymer of ethylene and methylacrylate. The lamination may be formed by machine direction orientation of an uncoated polypropylene base web followed by extrusion coating with the copolymer material and subsequent transverse direction orientation of the combined layers.

2 Claims, No Drawings

HEAT-SEALABLE LAMINAR THERMOPLASTIC FILMS

REFERENCE TO COPENDING APPLICATION

This is a division of application Ser. No. 248,937, filed Mar. 30, 1981 now U.S. Pat. No. 4,367,112, which is a continuation-in-part of application Ser. No. 99,171, filed Nov. 30, 1979.

BACKGROUND OF THE INVENTION

1. Field of the Invention

The present invention relates to laminated thermoplastic films. In particular, oriented polypropylene films are provided with a relatively thin surface coating of heat-sealable polymer material. The laminated oriented polypropylene film exhibits good heat-seal strength, broad heat-seal temperature range, and excellent optical properties.

2. Description of the Prior Art

Biaxially oriented polypropylene flms have been widely used in the past as packaging films, especially in the area of food packaging, since such films offer excellent optical, mechanical, and barrier properties. Expanded usage of such films, however, has been limited by the narrow heat-seal range thereof. Such films, moreover, at the elevated temperature requisite for heat sealing, characteristically pucker and tear. A means used in the past to overcome this and to allow such films to be satisfactorily sealed over a wide temperature range has been to apply heat-sealable coatings to the surface of the film. For example, the polypropylene has been coextruded with surface layers of an ethylene-propylene random copolymer and subsequently oriented. Although such films exhibit high seal strength, because of the relatively high melting point of the copolymer skin, the temperature range over which usable seals are formed is narrow. Similarly, oriented coextruded film has been prepared in which the skins are comprised of low density polyethylene which has been polymerized in a free radical-catalyzed process. In such case, because the melting point of the polyethylene skin is lower than that of the ethylene-propylene copolymer, a broader sealing range can be achieved. However, such films have shown poor adhesion between the skin and core layers showing an increased tendency to delaminate in heat-sealing operations. Consequently, the seal strengths provided by skins comprised of polyethylene which has been polymerized by a free radical-catalyzed process are not as high as those provided by an ethylene-propylene random copolymer skin. Moreover, the haze and gloss values of such films are poorer than those exhibited by uncoated oriented polypropylene films.

Additional problems encountered when attempting to form a coextruded biaxially oriented polyethylene coated polypropylene film include the tendency of the lower melting point polyethylene to adhere to the surface of draw rolls commonly employed to achieve machine direction orientation of the laminate. Attempts to remedy this problem are disclosed in U.S. Pat. No. 4,147,827, the disclosure of which is incorporated herein by reference. In that patent, the core polypropylene material is blended with another resin which has a plasticizing effect upon the modified polypropylene. This allows the coextruded base web, carrying the polyethylene coating, to be stretched at temperatures below which adhesion of the coating to the draw rollers occurs. Machine direction stretch at such low temperatures, however, may, under particular operating conditions, result in fibrillation of the modified polypropylene core material whereby the resultant biaxially oriented laminate may exhibit impaired physical properties. The following Table 1 sets forth specific physical property improvements when an unmodified polypropylene base web is compared to a polypropylene core layer which has been modified by the addition of a plasticizing agent, described by the manufacturer as an interpolymer of alpha-methylstyrene; aliphatic $C_5$ olefins; and terpenes.

TABLE 1

| Property | Plain Core | Modified Core |
|---|---|---|
| *WVTR | 0.35 | 0.45 |
| Ball Burst Strength (ASTM-905-37) | 15 | 1 |
| MO Ultimate (Psi) | 23,000 | 2,000 |
| Shrinkage at 275° F. | 5 to 7% | 10 to 20% |

*Water Vapor Transmission Ratio

It can be seen from the foregoing Table that attempts to modify the polypropylene base layer to effect machine direction orientation at low temperatures, result in a base layer having markedly reduced physical strength characteristics as well as lower barrier properties and undesirable shrinkage characteristics.

SUMMARY OF THE INVENTION

In accordance with the present invention, there is provided a biaxially oriented polypropylene film that is heat-sealable over a wide range of temperatures, that provides a high level of heat-seal strength, and that has good mechanical and optical properties. This is accomplished by forming a laminate consisting essentially of a biaxially oriented unmodified polypropylene core and at least one surface layer which comprises a low density, highly-branched copolymer of ethylene and methylacrylate (hereafter "EMA"). This copolymer can be produced by the high pressure free radical copolymerization of ethylene and methylacrylate.

A continuous method has been devised for manufacturing heat-sealable polypropylene film comprising the steps of forming a continuous thin film substrate comprising a substantially uniform layer of polypropylene homopolymer and uniaxially orienting the polypropylene layer by machine direction stretching of the film substrate. A thin coating of low-melting ethylene-copolymer is applied to the uniaxially oriented film substrate, the copolymer consisting essentially of about 6 to 30 weight percent methylacrylate and about 94 to 70 percent ethylene. The coated film is biaxially oriented by stretching the film transversely to the machine direction at a temperature above the melting point (about 87° C. to 104° C.) of the ethylene copolymer.

DESCRIPTION OF SPECIFIC EMBODIMENTS

In several of the following examples oriented film laminates were prepared by forming the skin and core resins into individual plaques by compression molding to the desired thickness. A composite, two-ply structure was then assembled, by joining the desired skin and core materials by heat sealing around the periphery of the assembly. This heat sealing step was simply to ensure that the individual plies did not become separated during handling prior to orientation. Biaxial orientation was accomplished by stretching the laminar assembly on a commercially available T. M. Long orientation apparatus. The heat seal tests reported in the following Table were carried out by sealing the coated surface of one laminate to the coated surface of another laminate.

Additionally, laminates in several of the following examples were formed by coextrusion of the skin and core resins utilizing conventional coextrusion techniques followed by solidification of the coextrudate by quenching in a water bath or on a casting roll; reheating the thus formed base sheet; orienting the laminate in the machine direction utilizing conventional machine direction orientation rollers and subsequently stretching the machine direction oriented assembly in the transverse direction on a conventional tenter frame. Alternatively, as indicated in the following examples, samples were also prepared utilizing an extrusion coating process whereby a single layer of polypropylene was extruded, solidified, and oriented in the machine direction. Subsequently, the skin resin was then melt-coated or extrusion coated on the already machine direction oriented base polypropylene web. The composite film was subsequently oriented in the transverse direction utilizing a tentering device.

The following examples are by way of illustration only and accordingly should not be construed in a limiting sense.

EXAMPLE 1

A 2.5–3 mil compression molded plaque of a copolymer of ethylene and methyl acrylate (2.0 Melt Index, 20% methyl acrylate content) and a 35 mil compression molded plaque of a polypropylene (0.905 density, 4.5 MFR) were assembled as described above. The assembly was inserted in the T. M. Long stretching apparatus, and following preheating for one minute at 315° F., was first stretched 5× at a rate of about 25,000%/min. (MD) and then was stretched 7× in a perpendicular direction to the first stretch at a rate of 3600%/min. (TD).

EXAMPLE 2

A coextrudate comprising a core of a polypropylene (0.905 density, 4.5 Melt Flow Rate) and surface layers of a copolymer of ethylene and methyl acrylate of Example 1, said surface layers constituting about 4% of the total sheet thickness per surface, was extruded and quenched on a casting roll at 40°–44° C. The quenched basesheet was then oriented biaxially in the T. M. Long stretching apparatus the same way as in Example 1.

EXAMPLE 3

The procedure of Example 1 was followed except that the skin resin was a copolymer of ethylene and methyl acrylate (6 Melt Index, 18% methyl acrylate content), having a melting point of 87° C.

EXAMPLE 4

The procedure of Example 1 was followed except that the skin resin was a copolymer of ethylene and methyl acrylate (2 Melt Index, 6% methyl acrylate content), having a melting point of 104° C., that was produced by high pressure free radical polymerization.

EXAMPLE 5

The procedure of Example 1 was followed except that the skin resin was a low density polyethylene homopolymer produced by the free radical-catalyzed process (2.4 Melt Index, 0.924 density).

EXAMPLE 6

A 1.5 mil laminar film was produced by extrusion-coating a copolymer of ethylene and methylacrylate (having a Melt Index of about 2.0 and containing about 20% by weight of methylacrylate) onto one side of a polypropylene base sheet (0.905 density, 4.5 Melt Flow Rate) which has already been oriented in the machine direction utilizing a draw ratio of 5:1. The resultant composite film was subsequently stretched in the transverse direction utilizing a transverse draw ratio of about 8:1 and stretching temperatures of between about 120° C. and 150° C. The layer of coating resin constituted approximately 20% by volume of the total laminar film thickness.

EXAMPLE 7

The procedure of Example 6 was followed except that the coating constituted about 10% by volume of the total film thickness.

EXAMPLE 8

The procedure of Example 7 was followed except that the total film thickness was 1.25 mils and the coating constituted about 15% by volume of the total film thickness.

EXAMPLE 9

The procedure of Example 6 was followed except that the coating consisted of an ethylene-ethylacrylate (EEA) copolymer manufactured by Union Cabide Corp., having a melt index of 8 and a melting point of 130° C. For this copolymer, a minimum seal temperature (ESM) of 270° F. to 280° F. was required to obtain satisfactory seal strength, whereas, for the EMA-coated polypropylene a minimum seal temperature of about 190° F. gives equivalent sealing properties.

The optical properties and sealing characteristics of biaxially oriented coextruded films produced in accordance with the preceding examples are set forth in the following Table II.

TABLE II

OPTICS AND SEALABILITY OF POLYPROPYLENE - ETHYLENE/METHYL ACRYLATE COPOLYMER LAMINATES

| | | | SEAL STRENGTH, gm/in. - °F. | | | | | | | | | | |
|---|---|---|---|---|---|---|---|---|---|---|---|---|---|
| EXAMPLE NO. | HAZE | GLOSS | 180 | 190 | 200 | 210 | 220 | 230 | 240 | 250 | 260 | 270 | 280 | 290 |
| 1 | 1.6 | 91.0 | 65 | 125 | 225 | 325 | 360 | 425 | 470 | 555 | 635 | 710 | 825 | 670 |
| 2 | — | — | 25 | 145 | 240 | 275 | 355 | 375 | 440 | 445 | 490 | 535 | 610 | 530 |
| 3 | 2.4 | 88.5 | 0 | 40 | 135 | 185 | 285 | 315 | 390 | 450 | 475 | 550 | 595 | 555 |
| 4 | 1.5 | 92.2 | 0 | 0 | 0 | 55 | 120 | 170 | 180 | 235 | 370 | 370 | 365 | 345 |
| 5 | 2.3 | 90.7 | 0 | 0 | 0 | 0 | 0 | 0 | 65 | 222 | 360 | 413 | 410 | 355 |
| 6 | 1.0 | — | 120 | 440 | 500 | 1340 | 1410 | 1630 | 1810 | 1730 | 1400 | 1370 | 1540 | 1920 |
| 7 | 1.6 | — | 40 | 230 | 340 | 600 | 890 | 1120 | 1040 | 1110 | 1210 | 1440 | 1400 | 1410 |
| 8 | 1.5 | — | 40 | 260 | 390 | 730 | 910 | 1100 | 1300 | 1200 | 1440 | 1440 | 1340 | 1400 |

TABLE II-continued

OPTICS AND SEALABILITY OF POLYPROPYLENE - ETHYLENE/METHYL ACRYLATE COPOLYMER LAMINATES

| | | | SEAL STRENGTH, gm/in. - °F. | | | | | | | | | | |
|---|---|---|---|---|---|---|---|---|---|---|---|---|---|
| EXAMPLE NO. | HAZE | GLOSS | 180 | 190 | 200 | 210 | 220 | 230 | 240 | 250 | 260 | 270 | 280 | 290 |
| 9 | — | — | minimum seal temperature (ESM) = 270° F. to 280° F. | | | | | | | | | | |

The preceding Table II illustrates that laminates prepared from a copolymer of ethylene and methylacrylate as a skin resin on a polypropylene substrate layer exhibit excellent heat sealability and optical properties which are far superior to polypropylene laminates having a skin resin formed from a low density polyethylene homopolymer (see Example 5).

Examples 6, 7, and 8 illustrate that when an extrusion coating process is employed to fabricate the multilayer EMA-coated polypropylene of the present invention, exceptionally high heat seal characteristics are exhibited. Additionally, as shown in Example 6, although a 10% coating thickness is sufficient to impart adequate heat seals, Examples 7 and 8 show that seal strengths improve with an increase in coating thickness.

It has been found that the ethylene methylacrylate copolymer skin resins that are particularly suitable for employment in the laminar films of the present invention include those which exhibit a Melt Index from about 2 up to about 6 and a methylacrylate content by weight of from about 6% up to about 30%, preferably about 18 to 20%. These EMA coolymers have a relatively low melting point. The preferred copolymers (e.g., 18% MA) melt at about 87° C. to 88° C., which provides a very broad range of seal temperature to obtain minimum seal strength. With lower amounts of MA comonomer (e.g., 6%), the melting point is higher, up to 104° C.

When the laminations of the present invention are employed in overwrap packaging applications, the total laminar film thicknesses are usually in the order of about 0.5 up to about 2.0 mils and preferably in the range of 0.7 up to about 1.5 mils. The total ethylene methylacrylate copolymer skin thickness employed in such constructions may vary from about 0.01 mil up to about 0.7 mil with a preferred skin thickness range of from about 0.02 up to about 0.30 mil.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for heat sealing a film combination comprising applying to the surface of a biaxially oriented film of stereoregular polypropylene a coating consisting essentially of a copolymer of ethylene and methyl acrylate containing from about 6% up to about 30% by weight of methacrylate; placing the coated film into contact with another so-coated polypropylene film surface wherein the contacting surfaces are both coated, and heat sealing the combination at a temperature below about 270° F.

2. A method for heat sealing a film combination comprising the steps of:

forming a continuous thin film substrate comprising a substantially uniform layer of polypropylene homopolymer; uniaxially orienting the polypropylene layer by machine direction stretching of the film substrate;

applying by melt coating or extrusion coating a thin coating of low-melting ethylene copolymer to the uniaxially oriented film substrate, said copolymer consisting essentially of about 6 to 30 weight percent methyl acrylate and about 94 to 70 percent ethylene, and having a minimum seal temperature between about 180° F. and below about 270° F.;

biaxially orienting the coated film by stretching the film transversely to the machine direction at a temperature above the melting point of the ethylene copolymer;

cooling the film to recover a biaxially oriented coated film; and placing the coated film into contact with another so-coated polypropylene film surface wherein the contacting surfaces are both coated, and heat sealing the combination at a temperature below about 270° F.

* * * * *